(12) United States Patent
Johnson et al.

(10) Patent No.: US 10,390,199 B2
(45) Date of Patent: Aug. 20, 2019

(54) MOBILE DEVICES, METHODS, AND COMPUTER PROGRAM PRODUCTS FOR PRIORITIZING DATA SETS

(71) Applicant: GOOGLE INC., Mountain View, CA (US)

(72) Inventors: Kai P Johnson, San Diego, CA (US); Ryan L Watkins, Brooklyn, NY (US)

(73) Assignee: GOOGLE LLC, Mountain View, CA (US)

( * ) Notice: Subject to any disclaimer, the term of this patent is extended or adjusted under 35 U.S.C. 154(b) by 735 days.

(21) Appl. No.: 14/614,630

(22) Filed: Feb. 5, 2015

(65) Prior Publication Data

US 2015/0230045 A1 Aug. 13, 2015

Related U.S. Application Data

(60) Provisional application No. 61/937,791, filed on Feb. 10, 2014, provisional application No. 61/938,898, (Continued)

(51) Int. Cl.
*G06Q 40/00* (2012.01)
*H04W 4/80* (2018.01)
(Continued)

(52) U.S. Cl.
CPC ............ *H04W 4/80* (2018.02); *G06Q 20/32* (2013.01); *G06Q 20/327* (2013.01); (Continued)

(58) Field of Classification Search
CPC .............................. G06Q 30/02; G06Q 40/00
See application file for complete search history.

(56) References Cited

U.S. PATENT DOCUMENTS 9,652,798 B2 * 5/2017 Globe ................ G06Q 30/0631
2007/0060045 A1 * 3/2007 Prautzsch .......... H04B 7/18523
455/3.06

(Continued)

FOREIGN PATENT DOCUMENTS

CN 101517592 A 8/2009
JP 2004-312289 A 11/2004
(Continued)

OTHER PUBLICATIONS

Mohri, "International Preliminary Report on Patentability issued in International Application No. PCT/US2015/014557", dated Aug. 25, 2016, 7 pages.

(Continued)

*Primary Examiner* — Kelly S Campen
(74) *Attorney, Agent, or Firm* — Johnson, Marcou & Isaacs, LLC

(57) ABSTRACT

Mobile devices, methods, and computer-program products are provided for prioritizing data sets. A transmission is received from a proximity broadcasting device. The transmission is a data packet that includes a unique identifier corresponding to the proximity broadcasting device. A proximity broadcasting system corresponding to the proximity broadcasting device is identified based on the unique identifier. At least one transaction data set corresponding to the proximity broadcasting system is selected from among a plurality of transaction data sets. The at least one transaction data set is prioritized above the remaining transaction data sets in a hierarchical order.

12 Claims, 10 Drawing Sheets

Related U.S. Application Data filed on Feb. 12, 2014, provisional application No. 61/940,077, filed on Feb. 14, 2014, provisional application No. 61/940,090, filed on Feb. 14, 2014.

(51) Int. Cl.

| | | |
|---|---|---|
| *G06Q 20/38* | (2012.01) | |
| *G06Q 20/32* | (2012.01) | |
| *G06Q 30/02* | (2012.01) | |
| *G06Q 20/36* | (2012.01) | |
| *H04L 12/18* | (2006.01) | |
| *H04L 12/58* | (2006.01) | |
| *H04L 29/06* | (2006.01) | |
| *H04W 12/06* | (2009.01) | |

(52) U.S. Cl.
CPC ..... *G06Q 20/3674* (2013.01); *G06Q 20/3821* (2013.01); *G06Q 30/0207* (2013.01); *G06Q 30/0238* (2013.01); *G06Q 30/0241* (2013.01); *G06Q 30/0268* (2013.01); *G06Q 40/00* (2013.01); *H04L 12/189* (2013.01); *H04L 51/26* (2013.01); *H04L 63/08* (2013.01); *H04W 12/06* (2013.01)

(56) References Cited

U.S. PATENT DOCUMENTS

| | | | |
|---|---|---|---|
| 2007/0278290 A1 | 12/2007 | Messerges et al. | |
| 2010/0257033 A1 | 10/2010 | Roberts et al. | |
| 2010/0323717 A1* | 12/2010 | Agashe | G01S 1/68 455/456.1 |
| 2011/0063999 A1 | 3/2011 | Erdmann et al. | |
| 2012/0109764 A1 | 5/2012 | Martin et al. | |
| 2012/0214443 A1 | 8/2012 | Daigle | |
| 2013/0210461 A1 | 8/2013 | Moldavsky et al. | |
| 2013/0281084 A1 | 10/2013 | Batada et al. | |
| 2013/0282438 A1* | 10/2013 | Hunter | G01S 1/02 705/7.32 |
| 2013/0331100 A1 | 12/2013 | Jamadagni et al. | |
| 2014/0038643 A1 | 2/2014 | Ngo et al. | |
| 2015/0100404 A1* | 4/2015 | Globe | G06Q 30/0631 705/14.27 |
| 2015/0230045 A1* | 8/2015 | Johnson | H04W 4/008 705/44 |

FOREIGN PATENT DOCUMENTS

| | | |
|---|---|---|
| JP | 2008-541295 A | 11/2008 |
| JP | 2011-203837 A | 10/2011 |
| JP | 2012-523036 A | 9/2012 |
| JP | 2012-194959 A | 10/2012 |
| KR | 10-2013-0129373 A | 11/2013 |
| WO | 2006/124227 A2 | 11/2006 |
| WO | 2013/163326 A1 | 10/2013 |
| WO | 2015/120116 A1 | 8/2015 |

OTHER PUBLICATIONS

Ziaie, "Office Action received for Canada Patent Application No. 2939324", dated Oct. 3, 2016, 3 pages.
Matsuno, "Japanese Office Action issued in Japanese Application No. 2016-550773", dated Jan. 30, 2017, 5 pages of English Translation and 4 pages of Japanese Office Action.
Park, "International Search Report and Written Opinion issued in International Application No. PCT/US2015/014557", dated Apr. 29, 2015, 10 pages.
Losseau, "Extended European Search Report issued in European Application No. 15746670.7", dated Jul. 26, 2017, 9 pages.
Matsuno, "Japanese Office Action issued in Japanese Application No. 2016-550773", dated Jul. 24, 2017, 5 pages of English Translation and 4 pages of Japanese Office Action.
Dominique, "European Office Action issued in European Application No. 15746670.7", dated Mar. 16, 2018, 11 Pages.
Dominique, "European Office Action issued in European Application No. 15746670", dated Jul. 11, 2018, 7 pages.
"Chinese Office Action issued in Chinese Application No. 201580017126.2", dated Jan. 8, 2019, 11 pages of English Translation and 08 pages of Chinese Office Action.

\* cited by examiner

MOBILE DEVICES, METHODS, AND COMPUTER PROGRAM PRODUCTS FOR PRIORITIZING DATA SETS

CROSS REFERENCE TO RELATED APPLICATIONS

This application claims the benefit under 35 U.S.C. § 119(e) of U.S. Provisional Patent Application No. 61/937,791, filed Feb. 10, 2014; No. 61/938,898, filed Feb. 12, 2014; No. 61/940,077, filed Feb. 14, 2014; and No. 61/940,090, filed Feb. 14, 2014. The foregoing applications are hereby incorporated by reference in their entirety and are made a part of this specification for all that they disclose.

BACKGROUND

Field

The current invention generally relates to mobile devices. More specifically, the current invention relates to systems, methods, and computer program products for using proximity broadcasting systems, such as Bluetooth® low energy (BLE) beacons to prioritize data sets.

Related Art

Bluetooth® low energy (BLE) devices (referred to as BLE beacons herein) send signals to mobile devices. BLE beacon communications are unidirectional, that is, only broadcasting or advertising but never receiving information back from any mobile device that receives the transmissions. Typical BLE beacons use periodic or continual broadcasts (or advertising) of data packets to communicate with nearby devices. These data packets are typically 31 bytes in size, with only 28 of those bytes usable for data. Once a mobile device receives the data packet, it can extract the data for use.

There is thus a need for mobile devices, methods, and programs to utilize the unique identifier from BLE beacons to perform a variety of actions that may include improving the ease of use of the mobile device in a mobile commerce environment.

BRIEF DESCRIPTION

The example embodiments presented herein meet the above-identified needs by providing mobile devices, methods, and computer program products for prioritizing data sets, generating notification commands in the vicinity of a terminal, and enabling a mobile device in the vicinity of a terminal.

In one example embodiment, the invention relates to a mobile device for prioritizing data sets. The mobile device includes a communication unit, at least one memory, and at least one processor coupled to the communication unit and the at least one memory. The communication unit is configured to receive a transmission from a proximity broadcasting device. The transmission is a data packet that includes a unique identifier corresponding to the proximity broadcasting device. The at least one memory is operable to store a plurality of transaction data sets. The plurality of transaction data sets is arranged in a hierarchical order. The at least one processor is configured to: identify a proximity broadcasting system corresponding to the proximity broadcasting device based on the unique identifier; select at least one transaction data set corresponding to the proximity broadcasting system from among the plurality of transaction data sets; and prioritize the at least one transaction data set above the remaining transaction data sets in the hierarchical order.

Preferably, the at least one processor identifies the proximity broadcasting system by transmitting, over a communications network, the unique identifier to a server and receiving from the server the identity of the proximity broadcasting system. Even more preferably, the at least one processor receives from another communicatively coupled server the identity of at least one preferred transaction data set, and selects the at least one transaction data set corresponding to the proximity broadcasting system if the at least one transaction data set is the at least one preferred transaction data set.

The at least one memory is also preferably operable to store unique identifiers corresponding to proximity broadcasting devices. In such a preferred mobile device the at least one processor also preferably records the unique identifier corresponding to the proximity broadcasting device and records the time and date the transmission from the proximity broadcasting device is received. The at least one processor also preferably receives a second transmission from a second proximity broadcasting device (the second transmission being a data packet that includes a second unique identifier corresponding to the second proximity broadcasting device), identifies a second proximity broadcasting system corresponding to the second proximity broadcasting device based on the second unique identifier, records the second unique identifier corresponding to the second proximity broadcasting device, and records the time and date the second transmission from the second proximity broadcasting device is received. In this preferred mobile device the at least one processor selects the at least one transaction data set corresponding to the proximity broadcasting system having the most recently received transmission from a proximity broadcasting device from among the plurality of transaction data sets.

In some preferred embodiments the plurality of transaction data sets is at least one of offer data and loyalty data. In other preferred embodiments the plurality of transaction data sets is payment credentials.

The communication unit is preferably configured to receive Bluetooth low energy transmissions and the transmission from the proximity broadcasting device is preferably a Bluetooth low energy transmission.

In another example embodiment, the invention relates to a method for prioritizing data sets stored on a mobile device. The method includes: receiving a transmission from a proximity broadcasting device, the transmission being a data packet that includes a unique identifier corresponding to the proximity broadcasting device; identifying a proximity broadcasting system corresponding to the proximity broadcasting device based on the unique identifier; selecting the at least one transaction data set corresponding to the proximity broadcasting system from among a plurality of transaction data sets, the plurality of transaction data sets being arranged in a hierarchical order; and prioritizing the at least one transaction data set above the remaining transaction data sets in the hierarchical order.

The proximity broadcasting system is preferably identified by transmitting, over a communications network, the unique identifier to a server, and receiving from the server the identity of the proximity broadcasting system. The method also preferably includes receiving from another communicatively coupled server the identity of at least one preferred transaction data set, and selecting the at least one transaction data set corresponding to the proximity broadcasting system if the at least one transaction data set is the at least one preferred transaction data set.

The method also preferably includes: recording the unique identifier corresponding to the proximity broadcasting device; recording the time and date the transmission from the proximity broadcasting device is received; receiving a second transmission from a second proximity broadcasting device, the second transmission being a data packet that includes a second unique identifier corresponding to the second proximity broadcasting device; identifying a second proximity broadcasting system corresponding to the second proximity broadcasting device based on the second unique identifier; recording the second unique identifier corresponding to the second proximity broadcasting device; recording the time and date the second transmission from the second proximity broadcasting device is received; and selecting the at least one transaction data set corresponding to the proximity broadcasting system having the most recently received transmission from a proximity broadcasting device from among the plurality of transaction data sets.

In some preferred embodiments the plurality of transaction data sets is at least one of offer data and loyalty data. In other preferred embodiments the plurality of transaction data sets is payment credentials. The transmission from the proximity broadcasting device is preferably a Bluetooth low energy transmission.

In yet another example embodiment, the invention relates to a non-transitory computer-readable medium having stored thereon sequences of instruction. The sequences of instruction are for causing at least one processor to: receive a transmission from a proximity broadcasting device, the transmission being a data packet that includes a unique identifier corresponding to the proximity broadcasting device; identify a proximity broadcasting system corresponding to the proximity broadcasting device based on the unique identifier; select at least one transaction data set corresponding to the proximity broadcasting system from among a plurality of transaction data sets, the plurality of transaction data sets being arranged in a hierarchical order; and prioritize the at least one transaction data set above the remaining transaction data sets in the hierarchical order.

Preferably the non-transitory computer-readable medium has stored thereon further sequences of instruction for causing the at least one processor to identify the proximity broadcasting system by transmitting, over a communications network, the unique identifier to a server; and receiving from the server the identity of the proximity broadcasting system. The non-transitory computer-readable medium may also preferably have stored thereon further sequences of instruction for causing the at least one processor to receive from another communicatively coupled server the identity of at least one preferred transaction data set and select the at least one transaction data set corresponding to the proximity broadcasting system if the at least one transaction data set is the at least one preferred transaction data set.

The non-transitory computer-readable medium may also preferably have stored thereon further sequences of instruction for causing the at least one processor to: record the unique identifier corresponding to the proximity broadcasting device; record the time and date the transmission from the proximity broadcasting device is received; receive a second transmission from a second proximity broadcasting device, the second transmission being a data packet that includes a second unique identifier corresponding to the second proximity broadcasting device; identify a second proximity broadcasting system corresponding to the second proximity broadcasting device based on the second unique identifier; record the second unique identifier corresponding to the second proximity broadcasting device; record the time and date the second transmission from the second proximity broadcasting device is received; and select the at least one transaction data set corresponding to the proximity broadcasting system having the most recently received transmission from a proximity broadcasting device from among the plurality of transaction data sets.

In some preferred embodiments the plurality of transaction data sets is at least one of offer data and loyalty data. In other preferred embodiments the plurality of transaction data sets is payment credentials. The transmission from proximity broadcasting device is also preferably a Bluetooth low energy transmission.

In still another example embodiment, the invention relates to a mobile device generating a notification command. The mobile device includes a communication unit and at least one processor coupled to the communication unit. The communication unit is configured to receive a transmission from a terminal. The transmission is a data packet that includes a unique identifier corresponding to the terminal. The at least one processor is configured to determine, using the unique identifier, whether the terminal is a predetermined type of terminal and generate a notification command when the terminal is the predetermined type of terminal.

Preferably the predetermined type of terminal is a transaction terminal. The communication unit is also preferably configured to receive Bluetooth low energy transmissions and the transmission is preferably a Bluetooth low energy transmission.

The mobile device may also preferably include a sound generating unit that is configured to: receive the notification command from the at least one processor; and generate a sound when the notification command is received. The mobile device may also preferably include a vibrator configured to receive the notification command from the at least one processor and vibrate the mobile device when the notification command is received. The mobile device may also preferably include a display configured to receive the notification command from the at least one processor and display at least one of text or graphics when the notification command is received.

Preferably, the at least one processor determines whether the terminal is a predetermined type of terminal by transmitting, over a communications network, the unique identifier to a server and receiving from the server the type of terminal that corresponds to the unique identifier.

In a further example embodiment, the invention relates to a method of generating a notification command for a mobile device. The method includes receiving a transmission from a terminal, the transmission being a data packet that includes a unique identifier corresponding to the terminal, determining, using the unique identifier, whether the terminal is a predetermined type of terminal, and generating a notification command when the terminal is the predetermined type of terminal.

Preferably the predetermined type of terminal is a transaction terminal. The transmission is preferably a Bluetooth low energy transmission.

The method also preferably includes generating a sound when the notification command is generated, vibrating the mobile device when the notification command is generated, and/or displaying at least one of text or graphics when the notification command is generated.

The method also preferably determines whether the terminal is a predetermined type of terminal by transmitting, over a communications network, the unique identifier to a server and receiving from the server the type of terminal that corresponds to the unique identifier.

In yet a further example embodiment, the invention relates to a non-transitory computer-readable medium having stored thereon sequences of instruction. The sequences of instruction are for causing at least one processor to: receive a transmission from a terminal, the transmission being a data packet that includes a unique identifier corresponding to the terminal; determine, using the unique identifier, whether the terminal is a predetermined type of terminal; and generate a notification command when the terminal is the predetermined type of terminal.

Preferably the predetermined type of terminal is a transaction terminal. The transmission is preferably a Bluetooth low energy transmission.

The non-transitory computer-readable medium may preferably have stored thereon further sequences of instruction for causing the at least one processor to generate a sound when the notification command is generated, vibrate the mobile device when the notification command is generated, and/or display at least one of text or graphics when the notification command is generated.

The non-transitory computer-readable medium may also preferably have stored thereon further sequences of instruction for causing the at least one processor to determine whether the terminal is a predetermined type of terminal by transmitting, over a communications network, the unique identifier to a server and receiving from the server the type of terminal that corresponds to the unique identifier.

In still a further example embodiment, the invention relates to a mobile device for enabling a mobile device in the vicinity of a terminal. The mobile device includes a communication unit, at least one memory, and at least one processor coupled to the communication unit and the at least one memory. The communication unit is configured to scan for and receive a transmission from a terminal. The transmission is a data packet that includes a unique identifier corresponding to the terminal. The at least one memory is operable to store verification data and the unique identifier. The at least one processor is configured to: receive authentication data; determine if the authentication data is valid based on a comparison of the authentication data and the verification data; enable processing of one or more commands if the authentication data is valid; direct the communication unit to perform a first scan for a transmission; determine, using the unique identifier, whether the terminal is a predetermined type of terminal when a transmission is received; record the unique identifier in the at least one memory when the terminal is the predetermined type of terminal; count, as elapsed time, the time since the processing of one or more commands was enabled; direct, when the elapsed time exceeds a predetermined threshold, the communication unit to perform a second scan for a transmission; and determine whether processing of one or more commands is disabled or remains enabled. In the mobile device, processing of one or more commands is disabled when the second scan does not detect a transmission, and processing of one or more commands remains enabled if the unique identifier received in the second scan corresponds to the unique identifier received from the first scan.

Preferably, if the unique identifier received in the second scan to the unique identifier received from the first scan does not match, the at least one processor is further configured to determine, using the unique identifier received in the second transmission, whether the terminal sending the second transmission is the predetermined type of terminal, and the processing of one or more commands remains enabled if the terminal sending the second transmission is the predetermined type of terminal.

The at least one processor is also preferably configured to disable processing of one or more commands when the elapsed time exceeds a second predetermined threshold, the second predetermined threshold being longer than the first predetermined threshold. The at least one processor may preferably determine whether the terminal is a predetermined type of terminal by transmitting, over a communications network, the unique identifier to a server and receiving from the server the type of terminal that corresponds to the unique identifier.

The predetermined type of terminal is preferably a transaction terminal. The communication unit is preferably configured to receive Bluetooth low energy transmissions and the transmission is preferably a Bluetooth low energy transmission.

In another example embodiment, the invention relates to a method of enabling a mobile device in the vicinity of a terminal. The method includes: receiving authentication data; determining if the authentication data is valid based on a comparison of the authentication data and verification data; enabling processing of one or more commands if the authentication data is valid; performing a first scan for a transmission from a terminal, the transmission being a data packet that includes a unique identifier corresponding to the terminal; determining, using the unique identifier, whether the terminal is a predetermined type of terminal when the transmission is received; recording the unique identifier in the at least one memory when the terminal is the predetermined type of terminal; counting, as elapsed time, the time since the processing of one or more commands was enabled; performing a second scan for a transmission when the elapsed time exceeds a predetermined threshold; and determining whether processing of one or more commands is disabled or remains enabled. Processing of one or more commands is disabled when the second scan does not detect a transmission, and processing of one or more commands remains enabled if the unique identifier received in the second scan corresponds to the unique identifier received from the first scan.

If the unique identifier received in the second scan to the unique identifier received from the first scan does not match, the method preferably includes determining, using the unique identifier received in the second transmission, whether the terminal sending the second transmission is the predetermined type of terminal and determining that processing of one or more commands remains enabled if the terminal sending the second transmission is the predetermined type of terminal.

The method also preferably includes disabling processing of one or more commands when the elapsed time exceeds a second predetermined threshold, the second predetermined threshold being longer than the first predetermined threshold.

Determining whether the terminal is a predetermined type of terminal is preferably determined by transmitting, over a communications network, the unique identifier to a server and receiving from the server the type of terminal that corresponds to the unique identifier.

The predetermined type of terminal is preferably a transaction terminal. The communication unit is preferably configured to receive Bluetooth low energy transmissions and the transmission is preferably a Bluetooth low energy transmission.

In yet another example embodiment, the invention relates to a non-transitory computer-readable medium having stored thereon sequences of instruction. The sequences of instruction are for causing at least one processor to: receive authentication data; determine if the authentication data is valid based on a comparison of the authentication data and verification data; enable processing of one or more commands if the authentication data is valid; perform a first scan for a transmission from a terminal, the transmission being a data packet that includes a unique identifier corresponding to the terminal; determine, using the unique identifier, whether the terminal is a predetermined type of terminal when a transmission is received; record the unique identifier in the at least one memory when the terminal is the predetermined type of terminal; count, as elapsed time, the time since the processing of one or more commands was enabled; direct, when the elapsed time exceeds a predetermined threshold, the communication unit to perform a second scan for a transmission; and determine whether processing of one or more commands is disabled or remains enabled. Processing of one or more commands is disabled when the second scan does not detect a transmission, and processing of one or more commands remains enabled if the unique identifier received in the second scan corresponds to the unique identifier received from the first scan.

The non-transitory computer-readable medium may preferably have stored thereon further sequences of instruction for causing, if the unique identifier received in the second scan to the unique identifier received from the first scan does not match, the at least one processor to determine, using the unique identifier received in the second transmission, whether the terminal sending the second transmission is the predetermined type of terminal and determine that processing of one or more commands remains enabled if the terminal sending the second transmission is the predetermined type of terminal.

Preferably, the non-transitory computer-readable medium also has stored thereon further sequences of instruction for causing the at least one processor to disable processing of one or more commands when the elapsed time exceeds a second predetermined threshold, the second predetermined threshold being longer than the first predetermined threshold.

The non-transitory computer-readable medium also preferably has stored thereon further sequences of instruction for causing the at least one processor to determine whether the terminal is a predetermined type of terminal by transmitting, over a communications network, the unique identifier to a server and receiving from the server the type of terminal that corresponds to the unique identifier.

The predetermined type of terminal is preferably a transaction terminal. The communication unit is preferably configured to receive Bluetooth low energy transmissions and the transmission is preferably a Bluetooth low energy transmission.

BRIEF DESCRIPTION OF THE DRAWINGS

The features and advantages of the example embodiments presented herein will become more apparent from the detailed description set forth below when taken in conjunction with the following drawings. Throughout the detailed description below and the following drawings like reference numerals refer to the same or similar elements.

DETAILED DESCRIPTION

I. Overview

The example embodiments presented herein are directed to mobile devices, methods, and computer program products for prioritizing data sets. This description is not intended to limit the application of the example embodiments presented herein. Also, the example embodiments presented herein are used in a mobile commerce environment. But, after reading the following description, it will be apparent to one skilled in the relevant art(s) how to implement the following example embodiments in alternative embodiments that can be utilized, for example, to process other types of contactless transactions including credits, debits, transfers, reservations, ticketing, and the like.

BLE beacons may have a wide variety of uses. For example, BLE beacons may be associated with other devices (e.g., remote computing systems) and entities (e.g., businesses, merchants, or organizations) may desire that their patrons (e.g., customers or members) identify these associated devices with a mobile device. In a mobile commerce environment, such a device associated with a BLE beacon may be a point of sale terminal. Additionally, BLE beacons may be associated with a geographical position. In the mobile commerce environment for example, a BLE beacon may be associated with a particular store or even a particular area within a store (e.g., entrance, men's department, women's department, or children's department). BLE beacons used in these ways may broadcast data packets containing a unique identifier associated with a particular associated device or area.

In one example embodiment, a mobile device may use the BLE beacons to prioritize data sets such as commerce data or payment credentials. In another example embodiment, a mobile device may use the BLE to notify the user of the mobile device that they are near a terminal capable of conducting a contactless transaction. In yet another example embodiment, the BLE may enable (or unlock) the mobile device in the vicinity of a terminal. Each of these embodiments will be discussed in turn below.

The terms "application," "applet," "widget" and/or the plural forms of these terms are used interchangeably herein to refer to an application (functioning independently or in conjunction with other applications) or set or subset of instructions or code, which when executed by one or more processors (e.g., in a mobile device or server) causes the processor(s) to perform specific tasks.

II. Mobile Device and System Having Proximity Broadcasting Devices

Figure 1:
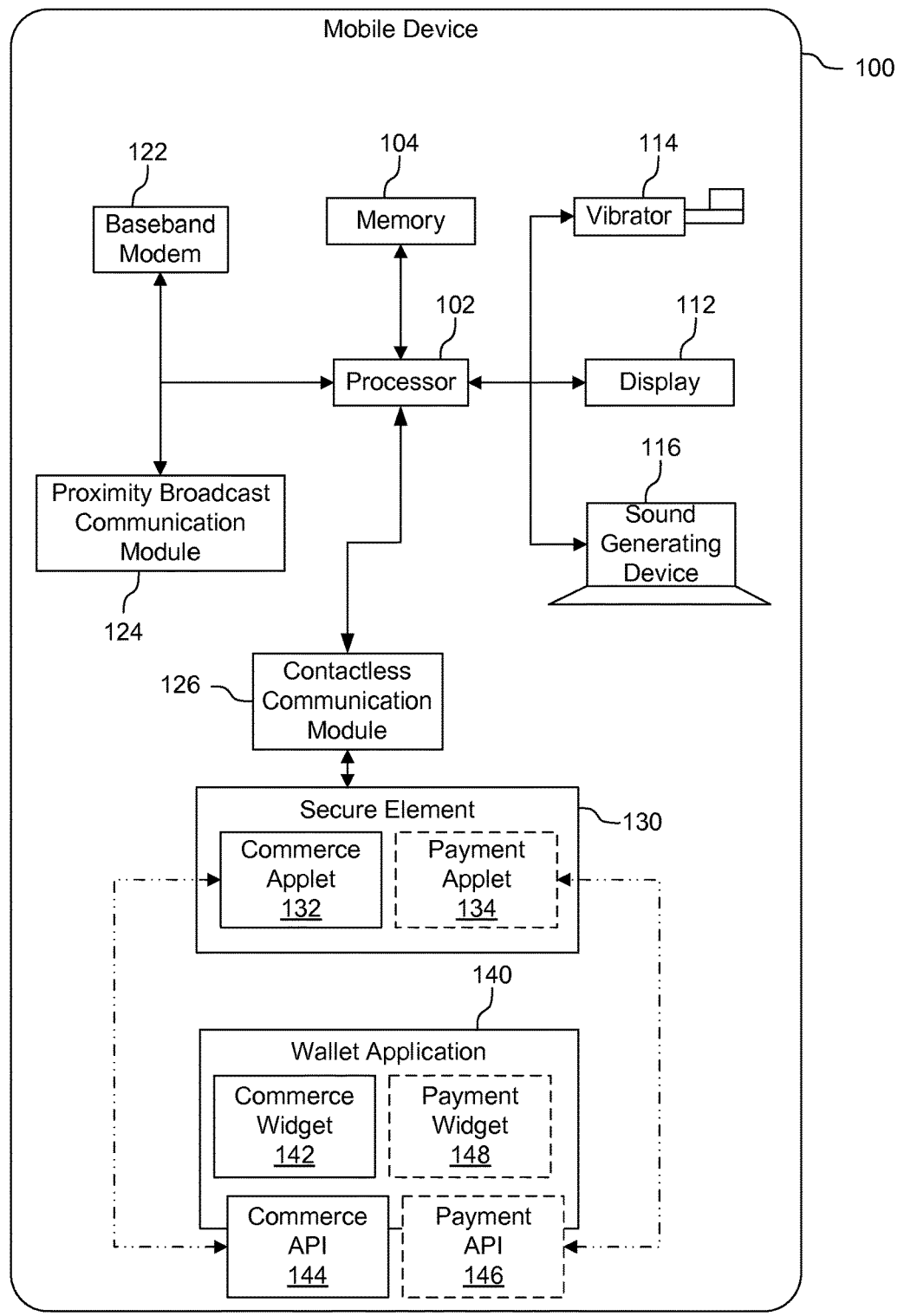
FIG. 1 is a schematic of a mobile device, according to an exemplary embodiment.

FIG. 1 is a schematic of a mobile device 100, according to an exemplary embodiment. In one example embodiment, the mobile device 100 is a cellular phone. In other embodiments, the mobile device 100 may be a tablet, a computer, or another type of device with connectivity to one or more mobile networks. Mobile device 100 includes at least one processor 102 coupled to at least one memory 104. While one processor and one memory are shown in FIG. 1, alternate embodiments may include multiple processors and/or multiple memories.

The mobile device may include various user interfaces including, for example, a display 112, a vibrator 114, a sound generating device 116, and the like. The display 112 may be any suitable display known in the art such as a light emitting diode (LED) display. The display 112 is coupled to the at least one processor 102 and is preferably configured to display graphics and text. The display 112 may also suitably be a touch screen display. The vibrator 114 is coupled to the at least one processor 102 and is used to vibrate the mobile device 100. The vibrator 114 may be any suitable vibrator known including, for example, a direct current electric motor that drives a shaft having a center of gravity that is offset from the axis of rotation. The sound generating device 116 is also coupled to the at least one processor 102 and is used to generate and emit sound. Any suitable sound generating device used in the art may be used including, for example, a speaker.

The mobile device also includes various communication modules including a baseband modem 122, a proximity broadcast communication module 124, and a contactless communication module 126. Baseband modem 122 is a digital modem that is used for mobile network communications.

Figure 2:
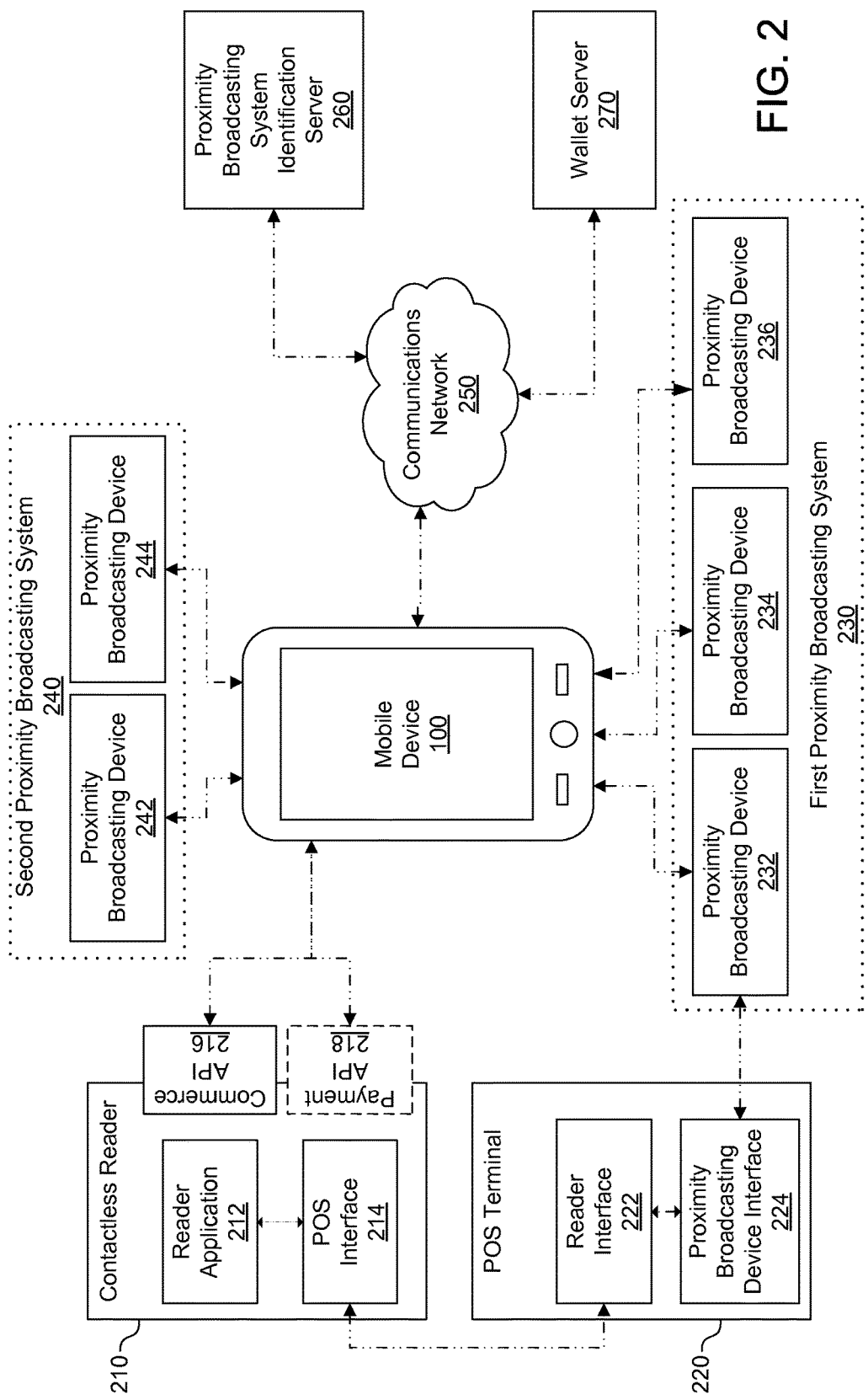
FIG. 2 is a diagram of a system utilizing the mobile device of FIG. 1, according to an exemplary embodiment.

The proximity broadcast communication module 124 is circuitry and/or hardware used in coordination with other components such as the processor 102 to receive transmissions from a proximity broadcasting device (232, 234, 236, 242, 244 in FIG. 2). In one example embodiment, when the proximity broadcasting device 232, 234, 236, 242, 244 is BLE beacon, the proximity broadcast communication module 124 may include an antenna configured to receive the data packet transmitted by the BLE beacon using network standards IEEE 802.15.X (IEEE 802.15.1, 802.15.4, etc.).

The contactless communication module 126 is circuitry and/or hardware that enables the mobile device 100 to exchange data with a reader (210 in FIG. 2). In one example embodiment, the contactless communication module 126 is used to exchange data between a secure element (SE) 130 of the mobile device 100 and the reader 210, which is communicatively coupled to a point of sale (POS) terminal 220. The contactless communication module 126 may be designed to work with, for example, near fieled communications (NFC) using ISO 14443 protocol or traditional Bluetooth® technology (i.e., non-BLE).

Secure element 130 may be implemented as a Universal Integrated Circuit Card (UICC), embedded SE card, secure micro secure digital (microSD) card, and the like. Secure element 130 may also be implemented as a virtual secure element, which can be maintained outside of the mobile device 100 on a memory accessible by the mobile device 100, including but not limited to, for example, a remote server or computer in the cloud, and the like. Secure element 130 is generally considered secure because it is a self-contained system, including dedicated memory, and is protected by hardware and software hardening techniques that are verified by independent testing.

Secure element 130 may include (e.g., stored thereon) one or more commerce applets. In one example embodiment, secure element 130 includes a commerce applet 132 associated with one or more commerce services and accounts issued by commerce service providers (SPs). A service provider is a company, organization, entity, or the like, that provides services to customers or patrons. Examples of service providers include merchants or companies issuing offers and/or loyalty accounts. A service may be an activity, capability, functionality, work, or use that is permitted or provided by a service provider, such as an offer or loyalty service.

Generally, a commerce applet 132 stores both loyalty and offer-related data, providing one or more interfaces through which this data can be managed and used. Commerce applet 132 operates as a generic storage container, allowing multiple loyalty/offers services to share mechanisms (e.g., secure element, mobile device) for loyalty/offer data management. If memory restrictions and performance requirements limit the amount of loyalty/offers data that can be stored on secure element 130, additional data can be stored in mobile device memory 104 and managed by the customer via commerce widget 142. For example, any graphic images related to an offer can be stored in memory 104 in order to optimize secure element memory allocation.

Commerce applet 132 includes a cached merchant data table enabling the storage/management of all data related to a given merchant. This allows the commerce data for a given merchant to be pre-loaded in secure element 130 or mobile device 100 by a wallet application 140.

Secure element 130 can also include one or more payment applets 134. Each payment applet 134 is associated with payment credentials, which includes, for example, a payment service and an account issued by a payment service provider. One or more payment applets 134 also can be loaded onto the secure element 130, for example, during manufacture and/or configuration of the secure element 130 and may be personalized to enable its use to conduct payment transactions.

The wallet application 140 stored on mobile device 100 includes instructions which, when executed by the processor 105 of the mobile device 100, cause the mobile device 100 to act as an instrument, for example, for processing transactions such as contactless commerce and/or payment transactions. The wallet application 140 serves as the primary user interface and allows a customer to access or use one or more services provided by service providers, communicate with service providers, and/or interact with contactless services and/or control the operation of contactless hardware of the mobile device 100. The wallet application 140 may utilize various user interfaces to interact with the user including the display 112, the vibrator 114, the sound generating device 116, and the like. The wallet application 140 is also used to manage the contactless transaction and contactless transaction data. The wallet application 140 communicates, through the use of APDU commands as defined in ISO 7816-4, with the commerce applet 132 via commerce API 144 and to payment applet 134 via payment API 146.

Commerce widget 142 is a component of the wallet application 140 that provides an interface for customers to manage commerce elements (e.g., loyalty card credentials, offers and rewards), for example, through interactions with the display 112 or other user interface of a mobile device. Commerce widget 142 maintains, for example, a master list of commerce elements present on the mobile device 110 in the secure element 130 or memory 102 of the mobile device.

The commerce widget 142 may also maintain and modify a hierarchal order of the commerce elements. For example, the various offers and coupons may be arranged in a hierarchal order that defines the priority in which they are displayed on the display 112. As will be discussed further below, the commerce widget may prioritize and modify this hierarchal order in order to display some offers and coupons ahead of or instead of others.

Payment widget 148 is a component of the wallet application 140 that provides an interface for customers to manage payment elements or payment credentials (e.g., credit or debit card credentials), for example, through interactions with the display 112 or other user interface of the mobile device 100. A user may select one payment credential to be used in a contactless transaction with the reader 210. This payment credential is considered to be the active payment credential in the wallet application 140. The payment widget may also allow the user to review, select, and change the active payment credential through a user interface such as the display 112.

FIG. 2 is a diagram of a system utilizing the mobile device 100, according to a preferred embodiment. In this system, the mobile device may be used to conduct a contactless transaction. To conduct a contactless transaction, a tap is performed by placing the mobile device 100 within a predetermined proximity to the reader 210. When tapped, the mobile device 100 becomes communicatively coupled to the reader 210 and exchanges data with the reader 210 while within the predetermined proximity to the reader 210. The reader 210 also is communicatively coupled to a point of sale (POS) terminal 220, where goods and/or services can be purchased. The point of sale terminal 220 may be within the same housing as reader 210. Alternatively, point of sale terminal 220 and reader 210 are communicatively coupled with each other but each of these components is housed separately.

Reader 210 includes a reader commerce application 212 (referred to herein simply as a "reader application") and a POS interface 214. Reader 210 manages two interfaces: one interface is with the secure element 130 in the mobile device 100 and the other interface is with POS terminal 220 which includes a reader interface 222. The functionality of reader 210 is the same whether reader 210 is standalone and connected to a payments terminal or merchant POS, or is integrated therein. The reader 210 also includes a reader payment application (not shown) as part of the reader application 212.

The mobile device 100 and the reader 210 exchange a series of commands and data to complete a contactless transaction. This exchange is described in, for example, U.S. Patent Appln. Pub. No. 2013/0317927, the entire contents of which are incorporated herein by reference. During the contactless transaction, the commerce applet 132 (see FIG. 1) interfaces with reader 210 via a commerce application programming interface (API) 216. In an exemplary embodiment, a commerce applet 132 is in the form of a JavaCard applet and is accessible and manageable through the use of application protocol data unit (APDU) commands as defined in ISO 7816-4. Also during the contactless transaction, the payment applet 134 (see FIG. 1) interfaces with reader 210 via payment API 218. In an exemplary embodiment, payment applet 134 is in the form of a JavaCard applet and is accessible through the use of APDU commands as defined in ISO 7816-4.

As shown in FIG. 2, mobile device 100 may receive transmissions from one or more proximity broadcasting devices 232, 234, 236, 242, 244. In this exemplary embodiment each proximity broadcasting device 232, 234, 236, 242, 244 is a BLE beacon. Each BLE beacon 232, 234, 236, 242, 244 has a memory, a processor, and an antenna. A data packet, which may include a unique identifier, is stored on the BLE beacon 232, 234, 236, 242, 244 memory. The BLE beacon antenna transmits radio frequencies that may be received by another device, such as a mobile device 100. Each of the BLE beacons 232, 234, 236, 242, 244 has a broadcast range less than approximately 100 meters, and broadcasts continuously at a frequency between approximately 2.4 GHz and approximately 2.5 GHz. "Broadcasting continuously," as used herein with respect to each of the BLE beacons 232, 234, 236, 242, 244, means broadcasting (or "advertising") data packets at a predetermined, continuous interval. For example, a BLE beacon 232, 234, 236, 242, 244 may broadcast a data packet once every half-second, once every second, once every ten seconds, etc. BLE beacons operate according to network standards IEEE 802.15.X (e.g., IEEE 802.15.1, 802.15.4, etc.). While this embodiment utilizes a BLE, any suitable proximity broadcasting device may be used including for example wireless routers, or wireless access points.

In this embodiment, proximity broadcasting devices 232, 234, 236 are part of a first proximity broadcasting system 230 and proximity broadcasting devices 242 and 244 are part of a second proximity broadcasting system 240. The first proximity broadcasting system 230 may belong to one entity, for example a first store in the mobile commerce environment, and the second proximity broadcasting system 240 may belong to a second entity such as a second store. Each proximity broadcasting device 232, 234, 236, 242, 244 may be associated with other devices (e.g., remote computing systems) or a geographical area. As shown in FIG. 2, for example, proximity broadcasting device 232 is associated with POS terminal 220, and the POS terminal 220 has a proximity broadcasting device interface 224 to interact with the proximity broadcasting device 232. Proximity broadcasting device 234 may be associated with another POS terminal, and proximity broadcasting device 236 may be located at an entrance of the first store. Similarly, proximity broadcasting device 242 may be located at an entrance of the second store, and proximity broadcasting device 244 may be located in a particular department of the second store. As will be described further below, the mobile device 100 may use transmissions from each of these proximity broadcasting devices to take various actions. Mobile device 100 may receive multiple transmissions from different proximity broadcasting devices. For example, mobile device 100 may receive a transmission from each of proximity broadcasting devices 232 and 234 because both POS terminals are near each other. Mobile device 100 may differentiate between the two proximity broadcasting devices using, for example, the systems, methods, and computer programs disclosed in U.S. patent application Ser. No. 14/592,085, the entire contents of which are incorporated herein by reference.

Mobile device 100 is also communicatively coupled to a communications network 250 by the baseband modem 122. The communications network may be any suitable network known in the art including, for example, mobile phone cellular networks, radio networks, and/or other types of networks, each of which may be operated by a corresponding communications (or mobile) network operator. Through the communications network 250, the mobile device can be communicatively coupled with various servers including a proximity system identification server 260 or a wallet server 270. As will be described further below, the mobile device 100 may communicate with the proximity system identification server 260 to determine what proximity broadcasting system a particular unique identifier is associated with and the type of device the proximity broadcasting device is associated with. Similarly, the mobile device 100 may communicate with the wallet server 270 to receive various information pertaining to payment credentials. While each of the proximity system identification server 260 and wallet server 270 has been described as a single server, these servers are not limited to a single server and may be implemented on more than one server.

It should be understood that other communications between the aforementioned devices may include communications with or through other intervening systems, hardware, and/or software, and such communications may include receiving, transferring, and/or managing data.

Figure 3:
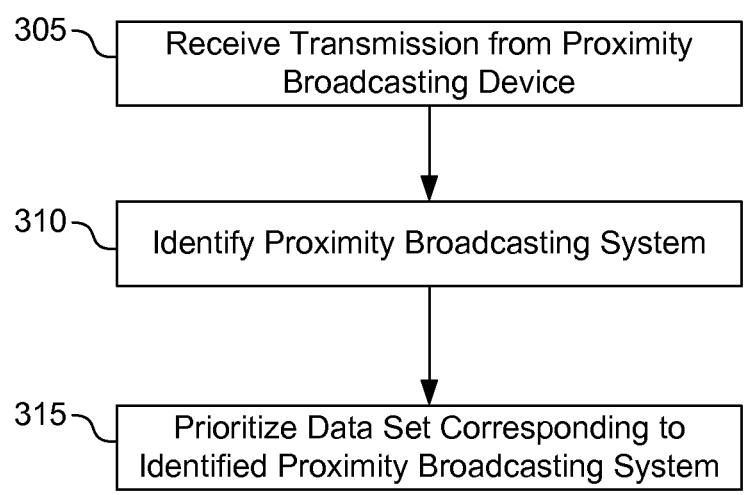
FIG. 3 is a flow chart for prioritizing data sets, according to an exemplary embodiment.
Figure 4:
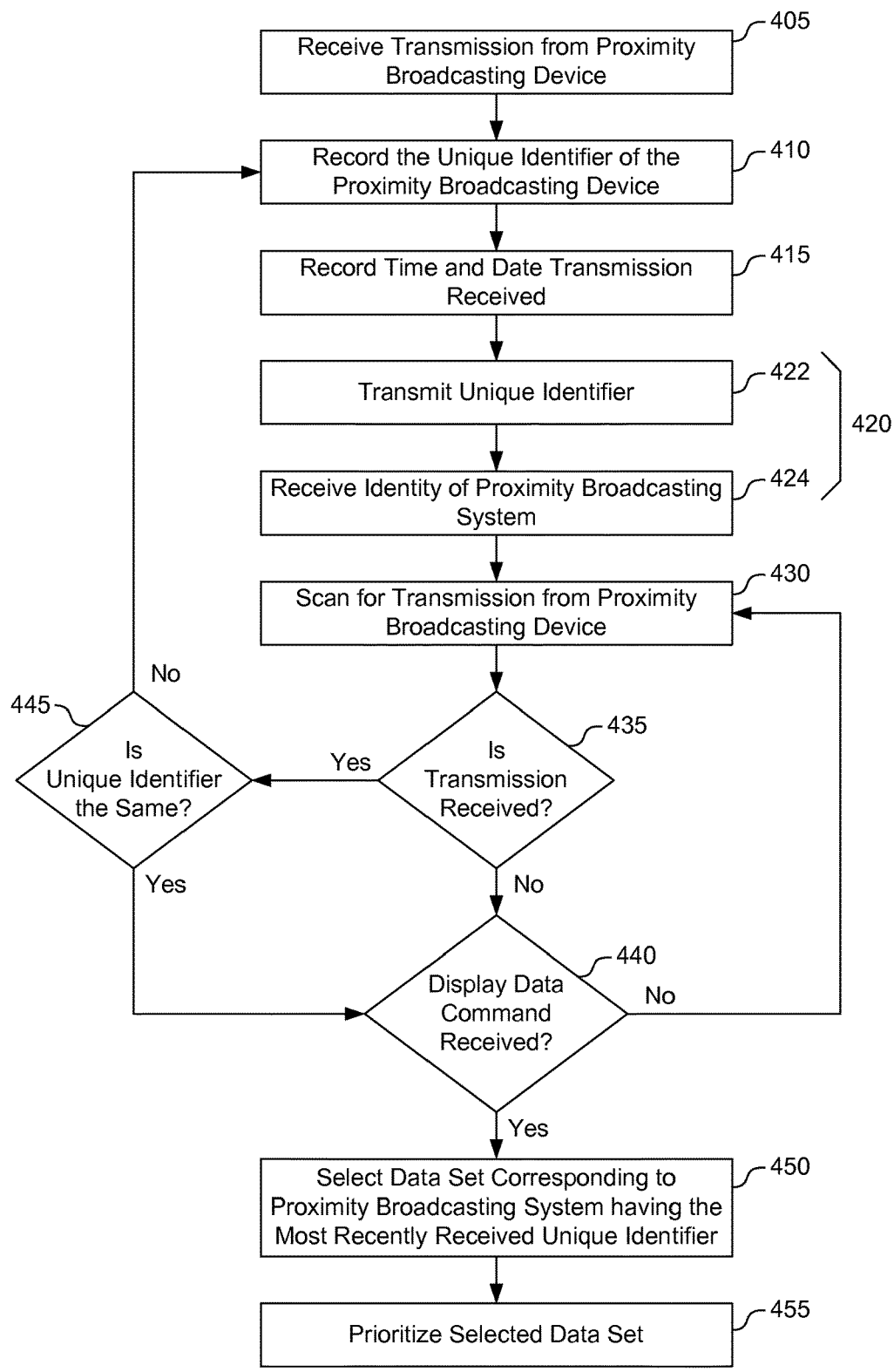
FIG. 4 is a flow chart for prioritizing data sets, according to another exemplary embodiment.

III. Process for Prioritizing Data Based on Transmissions Received from a Proximity Broadcasting Device The mobile device 100 may interact with the proximity broadcasting devices 232, 234, 236, 242, 244 in any number of ways. FIG. 3 is a flow chart for prioritizing data sets, according to an exemplary embodiment. In this exemplary embodiment, the mobile device 100 prioritizes data sets stored in the memory 104 of the mobile device 100 according to a unique identifier received from a proximity broadcasting device. In step 305, the mobile device receives a transmission from a proximity broadcasting device 236. The transmission is a data package that includes a unique identifier corresponding to the proximity broadcasting device 236. The mobile device 100 identifies the proximity broadcasting system that the proximity broadcasting device is a part of based upon the unique identifier in step 310. For example, the mobile device 100 may have a database stored in the memory 104 linking the unique identifier of the proximity broadcasting device to the proximity broadcasting system. In this example, the mobile device would identify that proximity broadcasting device 236 corresponds to the first proximity broadcasting system 230. Thus in step 315, the mobile device 100 can prioritize a data set corresponding to the first broadcasting system 230 over other data sets corresponding to other broadcasting systems. These transaction data sets may be, for example, commerce data including coupons or offers for a particular entity (e.g., merchant) that operates the proximity broadcasting system. As a result, the merchant can have their offer readily identified to the consumer operating the mobile device upon entering the store. Another embodiment of this prioritization of commerce data is shown in FIG. 4. In other embodiments, the data sets being prioritized may include payment credentials, which will be discussed in more detail with reference to FIGS. 5A and 5B. Those skilled in the art will recognize, however, that any suitable data set stored in the memory 104 of the mobile device 100, may be prioritized according to this embodiment.

FIG. 4 is a flow chart of another embodiment for prioritizing data sets stored in the memory 104 of the mobile device 100. In this embodiment, the data sets are commerce data corresponding to coupons, offers, and the like. Each data set may be associated with a particular entity, for example one data set is the coupons and offers from the first store, another data set is the coupons and offers from a second store, etc. In this embodiment, the commerce data, which is stored in a hierarchal order in memory 104, can be prioritized based on transmissions from proximity broadcasting devices.

In this embodiment, the mobile device 100 receives a transmission from the proximity broadcasting device 244 in step 405 when, for example the consumer enters the second store. In step 410 and 415, the commerce widget 142 records the unique identifier together with the time and date that the transmission from the proximity broadcasting device 244 is received. In step 420, the commerce widget 142 identifies the proximity broadcasting system corresponding to the proximity broadcasting device 244 using the unique identifier received in the transmission from the proximity broadcasting device 244. While this may be accomplished using the memory 104 of the mobile device 100 (as discussed above with reference to FIG. 3), the commerce widget 142, in step 422, may transmit the unique identifier over the communications network 250 to the communicatively coupled proximity broadcasting system identification server 260. The proximity broadcasting system contains a database linking unique identifiers to the proximity broadcasting system they are associated with. In step 424, the proximity broadcasting system identification server 260 transmits (and the commerce widget 142 receives) over the communication network 250, the identity of the proximity broadcasting system. In this example, the proximity broadcasting system would be identified as the second proximity broadcasting system 240.

Using a communicatively coupled server such as the proximity broadcasting system identification server 260 to identify the proximity broadcasting system may be particularly useful for proximity broadcasting devices that dynamically change their unique identifier. Some proximity broadcasting devices change their unique identifier periodically for security reasons. When the proximity broadcasting device (e.g., 244) changes its unique identifier, the proximity broadcasting device communicates with the proximity broadcasting identification server 260 to update the correlation between its unique identifier and the proximity broadcasting system 240. The proximity broadcasting identification server 260 may then limit access to the data stored thereon to only approved applications, such as the wallet application 140, or approved users, thus keeping the identity of the proximity broadcasting system secure.

In step 430, the commerce widget 142 scans, using the proximity broadcast communication module 124, for transmissions from a proximity broadcasting device (e.g., 242, 244). If no transmission is received in step 435, the commerce widget 142 repeats scanning step 430 until a transmission is received in step 435 or a command to display data is received in step 440. When the commerce widget 142 receives a transmission in step 435, the commerce widget 142 compares the unique identifier just received to the unique identifier previously recorded in step 445. If the unique identifiers are the same, the commerce widget 142 returns to step 435 to scan for transmissions unless a display data command is received in step 440.

If the unique identifiers are not the same in step 445, the commerce widget 142 returns to step 410 for the new unique identifier. For example, if the mobile device 100 user moves to the women's department in the second store the mobile device 100 will receive a transmission from proximity broadcasting device 242 in step 435. The mobile device will compare the unique identifiers in step 445 and determine that the unique identifier received from proximity broadcasting device 242 is different from the unique identifier received from proximity broadcasting device 244, thus returning to step 410 to record the new unique identifier, record the time and date in step 415. In step 420, the mobile device will then identify that proximity broadcasting device 242 is part of the second broadcasting system before returning to step 430. A similar process will occur if the transmission received in step 435 is from proximity broadcasting device 236 instead of proximity broadcasting device 242. In this example, however, the commerce widget 142 will identify in step 420 that the user has moved to the first store because proximity broadcasting device 236 is part of the first broadcasting system 230.

In step 440, the commerce widget 142 checks to see if a retrieve data command has been received. In this embodiment, the retrieve data command may include, for example, a user opening the wallet application 140 on the mobile device 100 and or a user selecting an opinion in the commerce widget 142 to issue a command to display commerce data such as coupons or offers. When the retrieve data command is received, the mobile device 100 selects, in step 450, a data set corresponding to the proximity broadcasting system having the most recently received unique identifier. In step 455, the selected data set is then prioritized over the other data sets in the hierarchical order. In this way, the selected and prioritized data set may then be displayed solely on the display 112 or at the top of the list. In this example embodiment the most recently received transmission was from proximity broadcasting device 236, which corresponds to the first proximity broadcasting system 230 and the first store. Thus, the mobile device displays the coupons and offers for the first store, where the user is currently located. They can then readily evaluate and use the relevant offers without having to search through multiple, non-relevant offers and coupons.

Figure 5A:
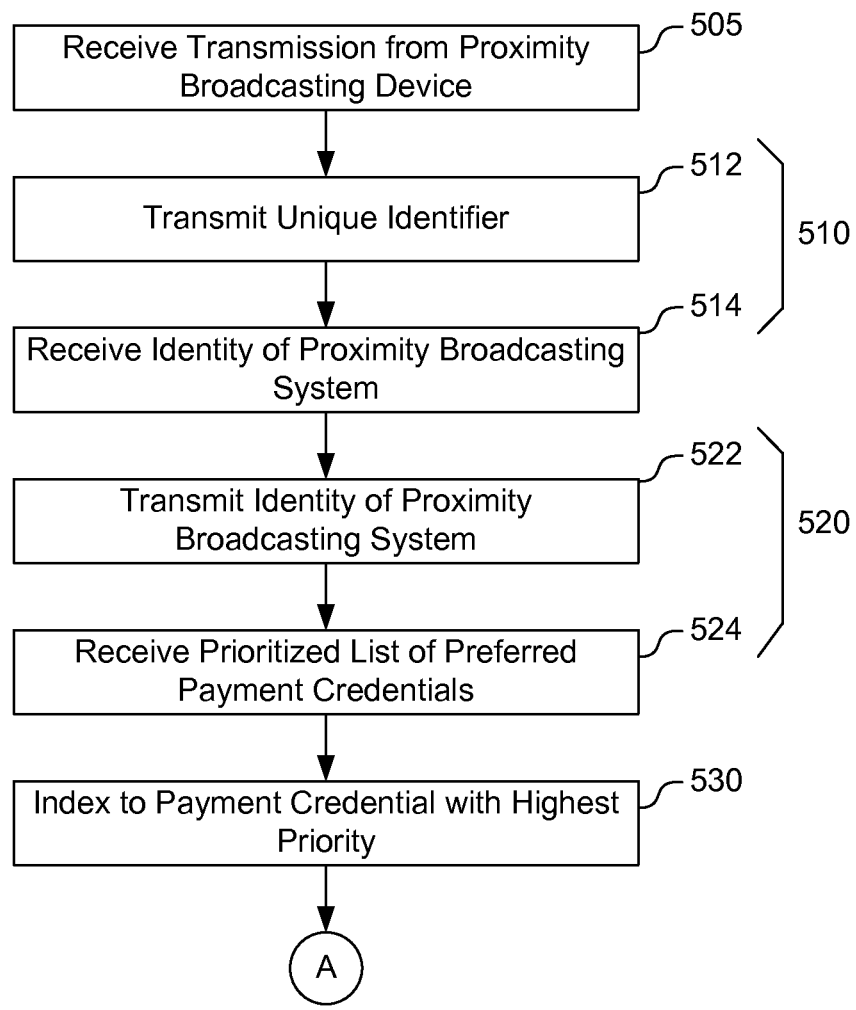
FIGS. 5A and 5B are flow charts for prioritizing data sets, according to another exemplary embodiment.
Figure 5B:
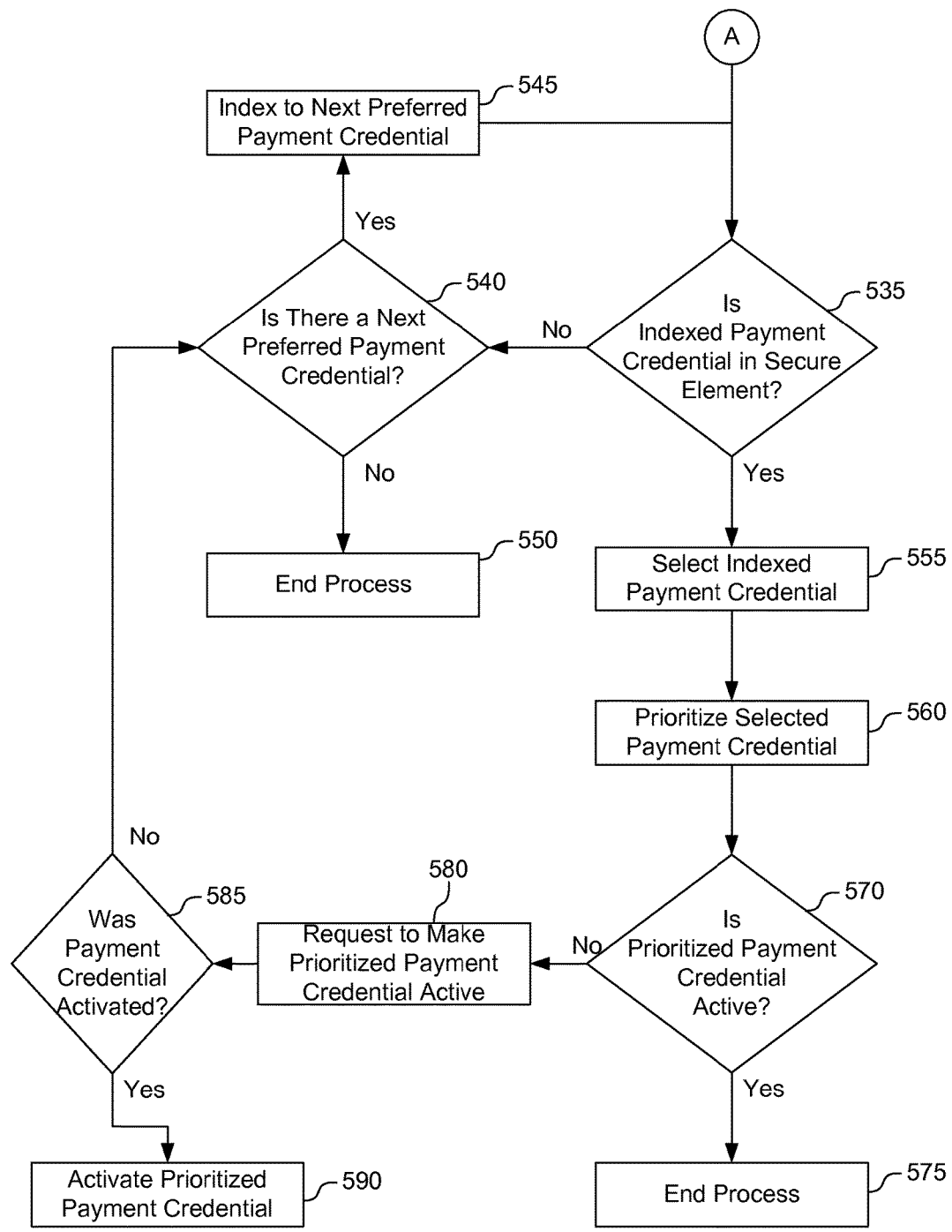

FIGS. 5A and 5B are flow charts of another embodiment for prioritizing data sets stored in the memory 104 or secure element 130 of the mobile device 100. In this embodiment, the data sets are payment credentials such as credit cards and the like. Entities, including merchants, may have preferred payment credentials that are used at their stores. For example, a merchant may have their own "store card" which is their preferred form of payment. But as a second preference, the merchant may prefer, for example, American Express® cards over MasterCard®, Visa®, Discover®, and the like. Proximity broadcasting devices 232, 234, 236, 242, 244 may be used by the payment widget 148 to prioritize the preferred payment credentials over the non-preferred credentials.

In step 505, the payment widget 148 receives a transmission proximity broadcasting device 236 containing a unique identifier for proximity broadcasting device 236. In step 510, the payment widget 148 identifies the proximity broadcasting system associated proximity broadcasting device 236 by transmitting the unique identifier, over the communication network 250, to the proximity system identification server 260 in step 512, and receiving the identity of the proximity broadcasting system from the proximity system identification server 260 in step 514. In step 520, the mobile device 100 obtains a prioritized ranking of preferred payment credentials by transmitting the identity of the proximity broadcasting system, over the communication network 250, to the wallet server 270 in step 522, and receiving the prioritized ranking of preferred payment credentials from wallet server 270 in step 524. While steps 510 and 520 have been described using separate servers and discrete steps, those skilled in the art will recognize the proximity system identification server 260 and the wallet server 270 may be the same server and steps 512-524 may be combined to transmit the unique identifier associated with the proximity broadcasting device 236 and receive the prioritized ranking of preferred payment credentials.

In step 530, the payment widget 148 indexes to the payment credential with the highest priority. The payment widget 148, checks if this payment credential is available in the payment applet 134 of the secure element 130 in step 535. If not, the payment widget 148 determines in step 540 if there are any other preferred payment credentials in the list received from the wallet server 270. If there are other preferred payment credentials in the list, the payment widget 148 indexes, in step 545 to the next preferred payment credential on the list and then returns to step 535. If, however, there are no other preferred payment credentials on the list, the prioritization process ends in step 550.

If the payment widget 148 determines that the preferred payment credential is available in the payment applet 134 of the secure element 130 (step 235), the payment widget 148 selects this payment credential in step 555 and prioritizes this data set over the other payment credentials in step 560. In step 570, the payment widget 148 determines if the selected payment credential is the active payment credential in the wallet application 140. If it is the active payment credential, the process ends in step 575. If the selected payment credential is not the active payment credential, the payment widget 148 requests or allows the user to make the selected payment credential the active payment credential in step 580. If the payment widget 148 does not receive a command to make the selected payment active, the mobile wallet returns to step 540. If an activation command is received, the payment widget 148 makes the selected payment credential active in the wallet.

While the process described above may be used prioritize preferred payment credentials, it may also be used to determine if there are any accepted payment credentials. In such a case, the mobile device receives not only a prioritized list of the preferred payment credentials in step 524, but also all of the accepted payment credentials. The process then continues with the process as described above, but if there are no further accepted payment credentials on the prioritized list in step 540, the payment widget 148 displays on the display 112 that there are no accepted payment credentials in the secure element 130 in step 550.

IV. Process for Generating a Notification Command for a Mobile Device

When a proximity broadcasting device is used to identify a POS terminal, for example proximity broadcasting device 232 linked to POS terminal 220 in FIG. 2, the transmission received by the proximity broadcasting device 232 may be used to generate a notification on the mobile device 100. This notification will indicate to the user that the POS terminal 220 is equipped to conduct a contactless transaction using the mobile device 100. The notification may also allow the user of the mobile device 100 to easily activate the wallet application 140 in order to conduct the contactless transaction.

Figure 6:
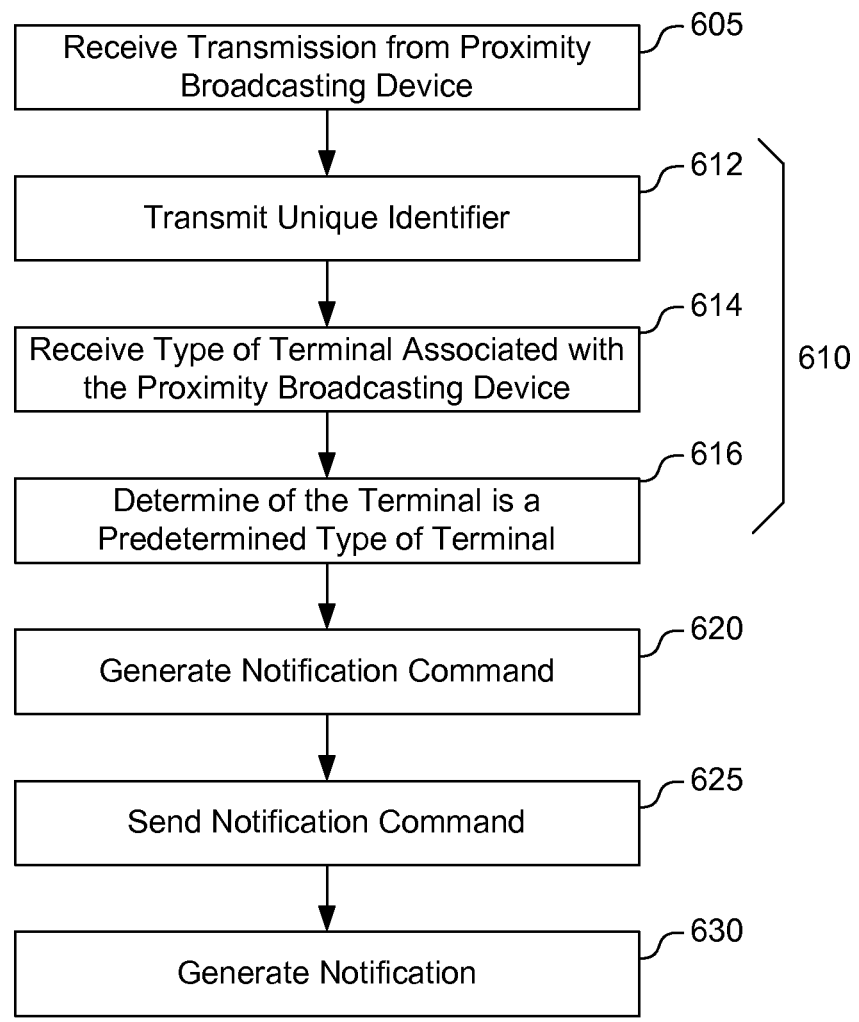
FIG. 6 is a flow chart of a process for generating a notification command, according to an exemplary embodiment.

FIG. 6 is a flow chart of a process for generating a notification command for a mobile device 100. In step 605, the mobile device 100 receives a transmission containing a unique identifier from the proximity broadcasting device 232. In step 610, the wallet application 140 identifies the type of device associated with the proximity broadcasting device 232 (terminal hereinafter) using the unique identifier received in the transmission from the proximity broadcasting device 232. While this may be accomplished using the memory 104 of the mobile device 100 (as discussed above with reference to FIG. 3), the wallet application 140, in step 612, may transmit the unique identifier over the communications network 250 to the communicatively coupled proximity broadcasting system identification server 260. In step 614, the proximity broadcasting system identification server 260 transmits (and the wallet application 140 receives), over the communication network 250, the type of terminal associated with the proximity broadcasting device. In step 616, the wallet application 140 then determines whether the terminal is a predetermined type of terminal. In this example, the predetermined type of terminal is a POS terminal and the proximity broadcasting system identification server 260 would transmit that proximity broadcasting device 232 is associated with POS terminal 220.

In this example, because terminal 220 is a POS terminal, the wallet application 140 would generate a notification command in step 620. The processor would then send the notification command in step 625 to one of the user interfaces 110 to generate a notification. When the user interface 110 receives the notification command, it would then generate the notification in step 630.

Any suitable user interface known in the art may be used with this process. When the user interface is the display 112, for example, the display may generate images and text to notify the user that they are in the proximity of a POS terminal 220 that can conduct a contactless transaction. The user may then be able to select the notification to open up the wallet application 140 in order to conduct a contactless transaction. Other types of notifications may be generated either independently or in conjunction with displaying text and graphics. When the user interface 110 is the vibrator 114, the DC motor may be driven to vibrate the mobile device 100 upon receipt of the notification command. Similarly, when the user interface 110 is a sound generating unit 116, the sound generating unit 116 may generate a sound, such as a series of tones, music, and the like.

IV. Process for Enabling a Mobile Device in the Vicinity of a Terminal

In conducting a contactless transaction, the payment widget 148 of the wallet application 140, receives authentication data such as a personal identification number (PIN). When the payment widget receives the authentication data, it compares it to verification data stored in, for example, secure element 130, to determine if the authentication data is valid. Put another way, did the user input the correct PIN? If the authentication data (PIN) is valid, the payment widget 148 enables the device to process one or more commands to conduct the contactless payment transaction. This is also known as unlocking the wallet application 140. Details of this process may be found in, for example, U.S. patent application Ser. No. 13/857,400, the entire contents of which are incorporated herein by reference. After a predetermined amount of time, the wallet application 140 then locks or disables the processing of one or more commands for conducting a contactless transaction.

Figure 7A:
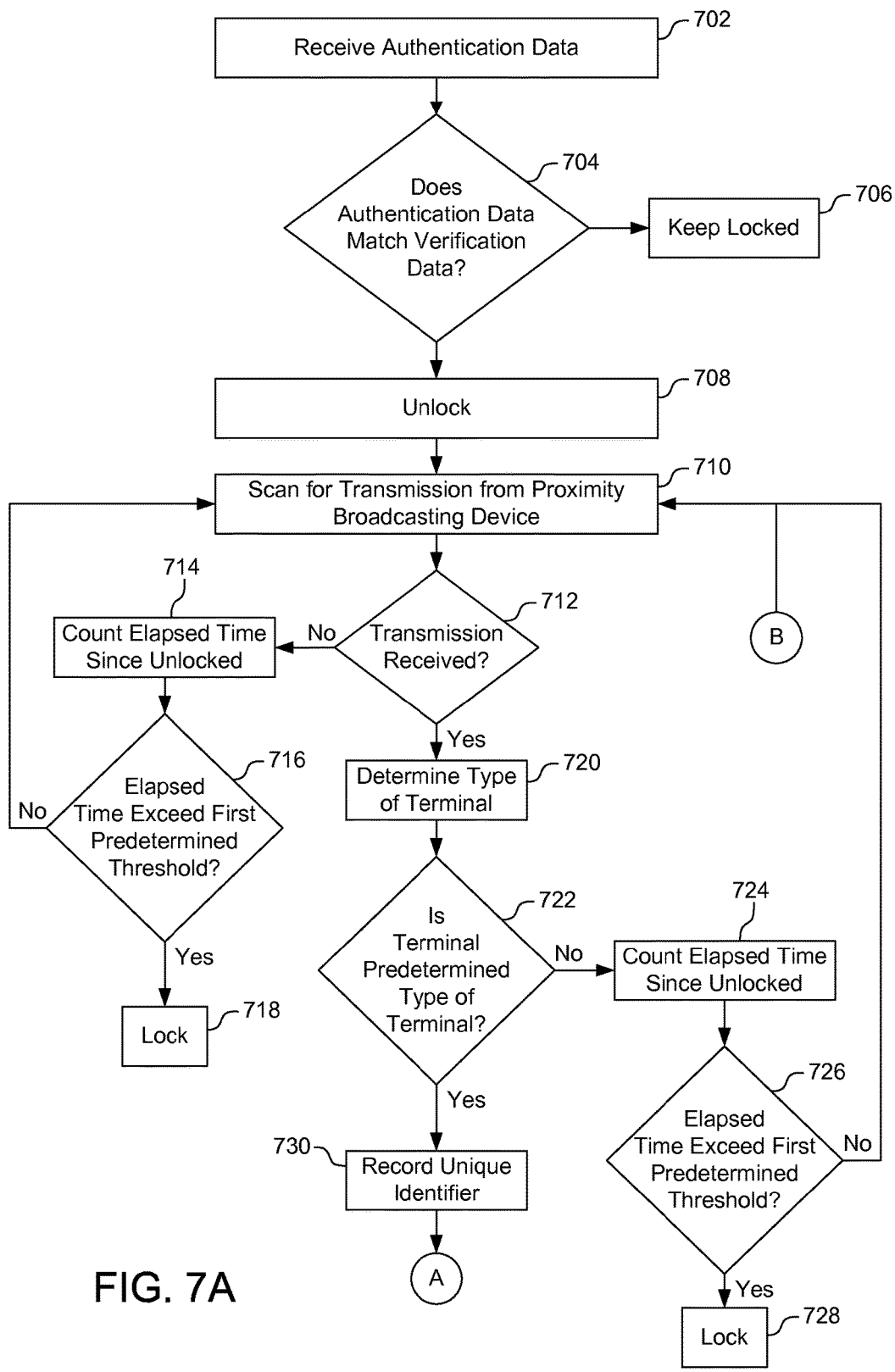
FIGS. 7A and 7B are flow charts of a process for enabling a mobile device in the vicinity of a terminal, according to an exemplary embodiment.
Figure 7B:
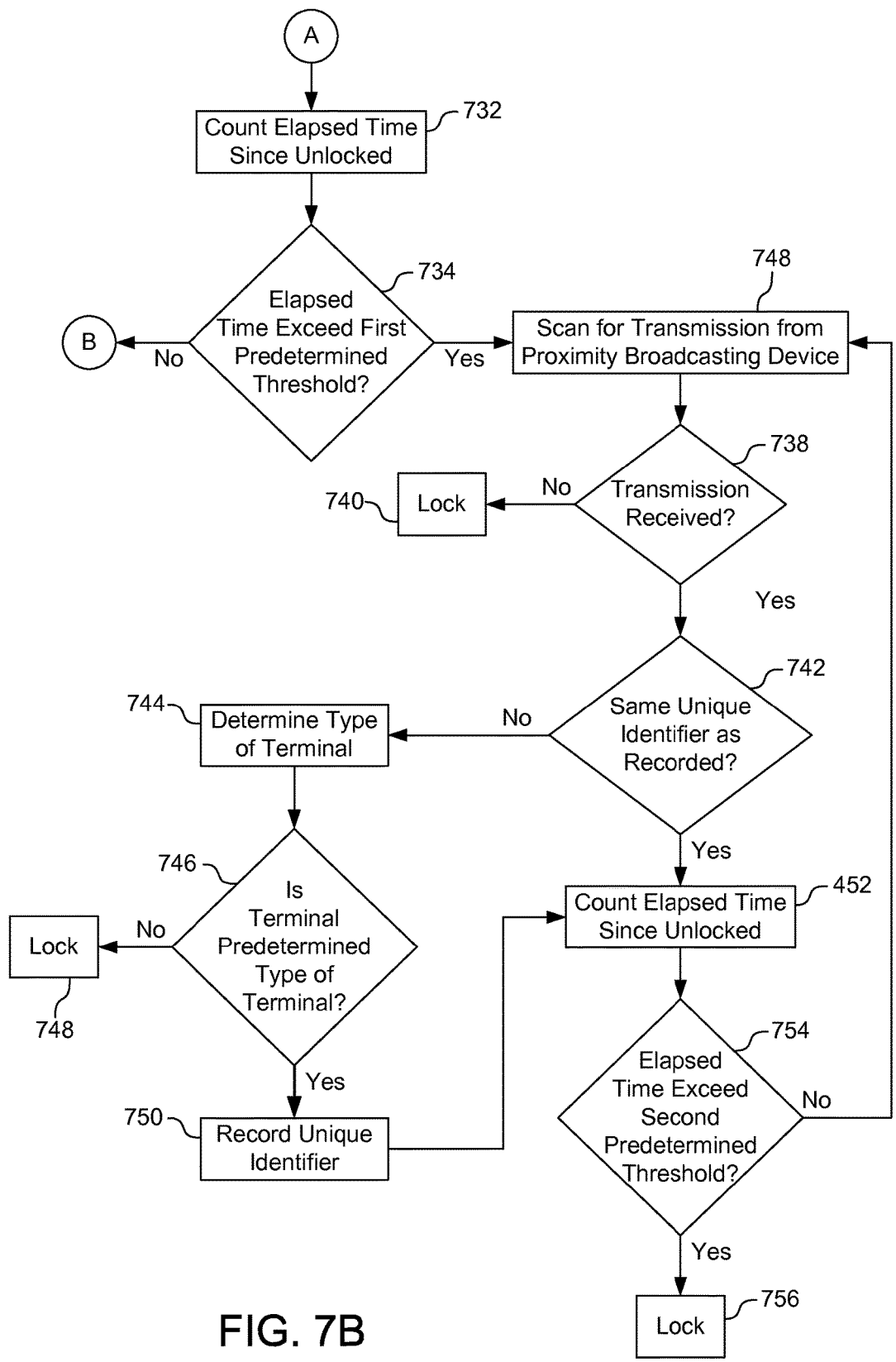
Figure 8:
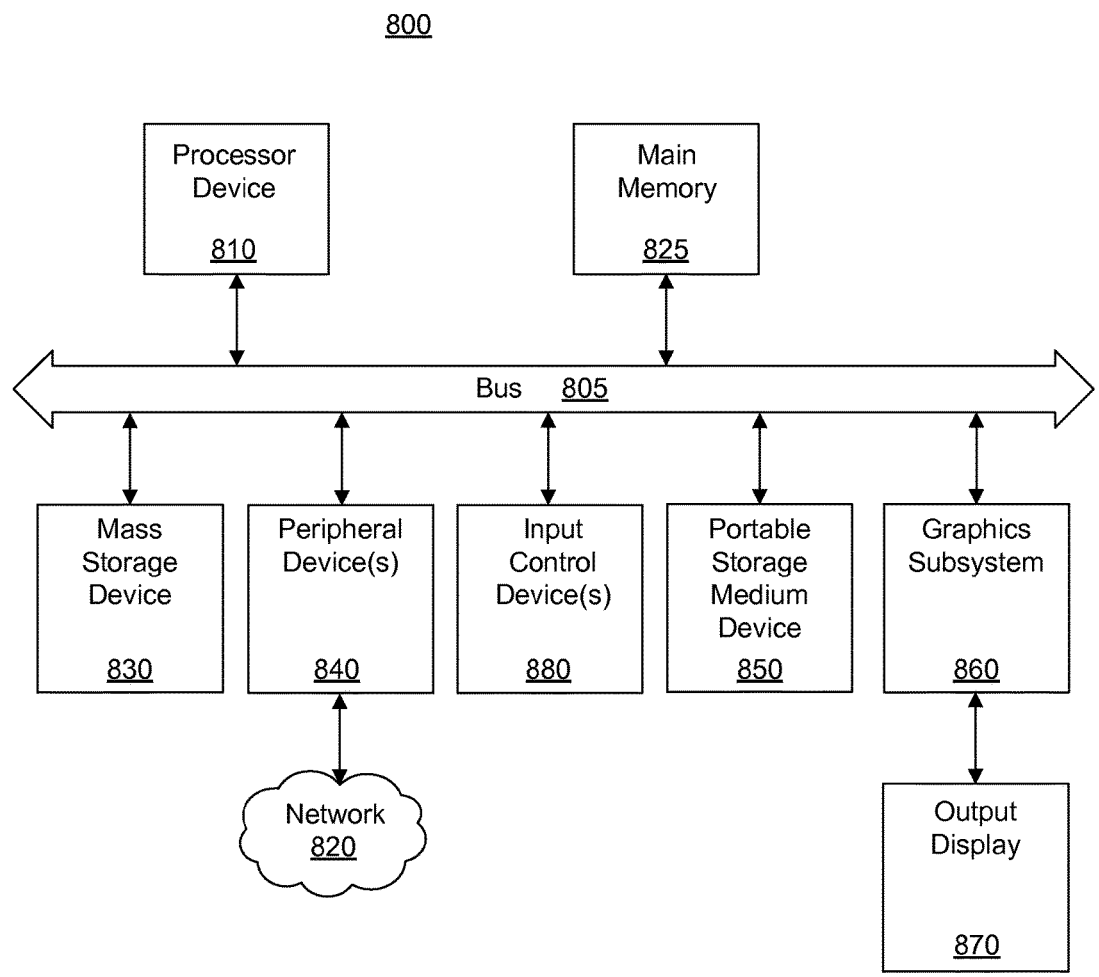
FIG. 8 is a collaboration diagram of functional modules deployed on a computer system, according to an exemplary embodiment.

A proximity broadcasting device 232, 234 may be used to keep the wallet application 140 unlocked while the mobile device is near the POS terminal 220. FIGS. 7A and 7B are flow charts of a process for enabling a mobile device in the vicinity of a terminal. In step 702, the payment widget 148 receives authentication data. The payment widget 148 compares the authentication data to verification data in step 704. If they do not match, the payment widget 148 keeps the wallet application 140 locked in step 706. If the authentication data and the verification data do match, the payment widget 148 unlocks the wallet application 140 to conduct a contactless transaction in step 708. The mobile device scans for transmissions from proximity broadcasting devices 232, 234, 236 in step 710 and determines if a transmission is received from a proximity broadcasting device 232 in step 712.

If a transmission is not received, the wallet application 140 counts, in step 714, the time that has elapsed since the wallet application 140 was unlocked (step 708). In step 716, the wallet application 140 then determines if the elapsed time has exceeded a first predetermined threshold. If it has, the wallet application 140 then locks in step 718, but if not, the process returns to step 710. In this way, wallet application 140 locks if the mobile device is not in the vicinity of a POS terminal.

If a transmission is received in step 712, the wallet application 140 determines the type of terminal associated with proximity broadcasting device 232 in step 720. This process may be the same as step 610 discussed above in reference to FIG. 6 and discussion of these steps is omitted here. In step 722, the wallet application 140 determines if the terminal is a predetermined type of terminal (e.g., a POS terminal in this embodiment). If the terminal is not a POS terminal, the wallet application 140 counts, in step 724, the time that has elapsed since the wallet application 140 was unlocked (step 708). In step 726, the wallet application 140 then determines if the elapsed time has exceeded the first predetermined threshold. If it has, the wallet application 140 then locks in step 728, but if not, the process returns to step 710.

If the wallet application 140 determines that the terminal is a POS terminal (step 722), the wallet application then records in memory 104 the unique identifier associated with the proximity broadcasting device 232 in step 730. In step 732, the wallet application 140 counts the time that has elapsed since the wallet application 140 was unlocked (step 708), and, in step 734, the wallet application 140 then determines if the elapsed time has exceeded the first predetermined threshold. If not, the process returns to step 710.

Unlike the previous counting steps (steps 716 and 726), the wallet application 140 does not lock when the elapsed time exceeds the first predetermined threshold and the mobile device 100 is in the proximity of a POS terminal. Instead, the wallet application 140 remains unlocked, and the wallet application continues to step 736, where the mobile device 100 scans for a transmission from a proximity broadcasting device 232. If in step 738 the wallet application 140 determines that the mobile device 100 has not received a transmission from a proximity broadcasting system, the wallet application locks in step 740. For example, if the mobile device 100 is moved away from a POS terminal.

But if a transmission is received (referred to as a second transmission), the wallet application 140 compares, in step 742, the unique identifier received in the second transmission with the unique identifier previously recorded (step 730). If the unique identifiers do not match, the wallet application 140 then determines, in step 744, the type of terminal associated with proximity broadcasting device that sent the second transmission. This terminal is referred to as the second terminal. As with step 720, this process may be the same as step 610 discussed above in reference to FIG. 6 and discussion of these steps is omitted here. In step 746, the wallet application 140 determines if the second terminal is a predetermined type of terminal (e.g., a POS terminal in this embodiment). If the second terminal is not a POS terminal, the wallet application 140 locks, but if it is, the wallet application 140 records the unique identifier in the memory 104 in step 750. The unique identifier received in the second transmission then replaces the unique identifier recorded previously (step 730). In this way, the wallet application 140 allows the mobile device to move from one POS terminal to another POS terminal nearby without the wallet application 140 locking.

As long as the wallet application 140 determines that the second transmission is from a POS terminal in either step 742 or 746, the process moves to step 752 where the wallet application 140 counts the time that has elapsed since the wallet application 140 was unlocked (step 708). In step 754, the wallet application 140 then determines if the elapsed time has exceeded the second predetermined threshold. This second predetermined threshold is a longer time than the first predetermined threshold and provides a hard lock function. When the elapsed time exceeds the second predetermined threshold, it then locks in step 756, but if not, the process returns to step 748.

VI. Computer Readable Medium Implementation

The example embodiments described above, such as, for example, the systems and procedures depicted in or discussed in connection with FIGS. 1 through 7 or any part or function thereof, may be implemented by using hardware, software or a combination of the two. The implementation may be in one or more computers or other processing systems. While manipulations performed by these example embodiments may have been referred to in terms commonly associated with mental operations performed by a human operator, no human operator is needed to perform any of the operations described herein. In other words, the operations may be completely implemented with machine operations. Useful machines for performing the operation of the example embodiments presented herein include general-purpose digital computers or similar devices.

FIG. 6 is a block diagram of a general and/or special purpose computer 800, which may be a general and/or special purpose computing device, that may be employed in accordance with various example embodiments herein. The computer 800 may be, for example, a user device, a user computer, a client computer, and/or a server computer, among other things.

The computer 800 may include without limitation a processor device 810, a main memory 825, and an interconnect bus 805. The processor device 810 may include without limitation a single microprocessor, or may include a plurality of microprocessors for configuring the computer 800 as a multi-processor system. The main memory 825 stores, among other things, instructions and/or data for execution by the processor device 810. The main memory 825 may include banks of dynamic random access memory (DRAM), as well as cache memory.

The computer 800 may further include a mass storage device 830, peripheral device(s) 840, portable non-transitory storage medium device(s) 850, input control device(s) 880, a graphics subsystem 860, and/or an output display 870. For explanatory purposes, all components in the computer 800 are shown in FIG. 6 as being coupled via the bus 805. However, the computer 800 is not so limited. Devices of the computer 800 may be coupled via one or more data transport means. For example, the processor device 810 and/or the main memory 825 may be coupled via a local microprocessor bus. The mass storage device 830, peripheral device(s) 840, portable storage medium device(s) 850, and/or graphics subsystem 860 may be coupled via one or more input/output (I/O) buses. The mass storage device 830 may be a non-volatile storage device for storing data and/or instructions for use by the processor device 810. The mass storage device 830 may be implemented, for example, with a magnetic disk drive or an optical disk drive. In a software embodiment, the mass storage device 830 is configured for loading contents of the mass storage device 830 into the main memory 825.

The portable storage medium device 850 operates in conjunction with a nonvolatile portable storage medium, such as, for example, a compact disc read only memory (CD-ROM), to input and output data and code to and from the computer 800. In some embodiments, the software for storing information may be stored on a portable storage medium, and may be inputted into the computer 800 via the portable storage medium device 850. The peripheral device (s) 840 may include any type of computer support device, such as, for example, an input/output (I/O) interface configured to add additional functionality to the computer 800. For example, the peripheral device(s) 840 may include a network interface card for interfacing the computer 800 with a network 820.

The input control device(s) 880 provide a portion of the user interface for a user of the computer 800. The input control device(s) 880 may include a keypad and/or a cursor control device. The keypad may be configured for inputting alphanumeric characters and/or other key information. The cursor control device may include, for example, a handheld controller or mouse, a trackball, a stylus, and/or cursor direction keys. In order to display textual and graphical information, the computer 800 may include the graphics subsystem 860 and the output display 870. The output display 870 may include a cathode ray tube (CRT) display and/or a liquid crystal display (LCD). The graphics subsystem 860 receives textual and graphical information, and processes the information for output to the output display 870.

Each component of the computer 800 may represent a broad category of a computer component of a general and/or special purpose computer. Components of the computer 800 are not limited to the specific implementations provided here.

Software embodiments of the example embodiments presented herein may be provided as a computer program product, or software, that may include an article of manufacture on a machine-accessible or machine-readable medium having instructions. The instructions on the non-transitory machine-accessible machine-readable or computer-readable medium may be used to program a computer system or other electronic device. The machine- or computer-readable medium may include, but is not limited to, floppy diskettes, optical disks, CD-ROMs, and magneto-optical disks or other types of media/machine-readable medium suitable for storing or transmitting electronic instructions. The techniques described herein are not limited to any particular software configuration. They may find applicability in any computing or processing environment. The terms "computer-readable", "machine-accessible medium" or "machine-readable medium" used herein shall include any medium that is capable of storing, encoding, or transmitting a sequence of instructions for execution by the machine and that causes the machine to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Portions of the example embodiments of the invention may be conveniently implemented by using a conventional general-purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-Ray Disc, a DVD, a CD or CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further include software for performing example aspects of the invention, as described above.

Included in the programming and/or software of the general and/or special purpose computer or microprocessor are software modules for implementing the procedures described above.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above-described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A mobile device to receive unique identifiers from proximity broadcasting systems to prioritize data sets, the mobile device comprising:
　　a communication unit configured to receive a transmission from a proximity broadcasting device, the transmission being a data packet that includes a unique identifier corresponding to the proximity broadcasting device;
　　at least one memory operable to store a plurality of transaction data sets, the plurality of transaction data sets being arranged in a hierarchical order, and wherein the plurality of transaction data sets are payment credentials; and
　　at least one processor coupled to the communication unit and the at least one memory, the at least one processor being configured to:
　　　　identify a proximity broadcasting system corresponding to the proximity broadcasting device based on the unique identifier;
　　　　select at least one transaction data set corresponding to the proximity broadcasting system from among the plurality of transaction data sets stored on the mobile device;
　　　　prioritize the at least one transaction data set above the remaining transaction data sets in the hierarchical order so that the mobile device can prioritize the data set corresponding to the proximity broadcasting system over other data sets corresponding to other broadcasting systems;
　　　　modify the hierarchical order of the prioritized data set; and
　　　　communicate instructions to a user interface of the mobile device to cause the user interface of the mobile device to display the prioritized transaction data set at the top of a list.

2. The mobile device of claim 1, wherein the at least one processor identifies the proximity broadcasting system by:
　　transmitting, over a communications network, the unique identifier to a server; and
　　receiving from the server the identity of the proximity broadcasting system.

3. The mobile device of claim 2, wherein the at least one processor is further configured to:
　　receive from another communicatively coupled server the identity of at least one preferred transaction data set; and
　　select the at least one transaction data set corresponding to the proximity broadcasting system when the at least one transaction data set is the at least one preferred transaction data set.

4. The mobile device of claim 1, wherein the communication unit is configured to receive Bluetooth low energy transmissions and the transmission from the proximity broadcasting device is a Bluetooth low energy transmission.

5. A method for prioritizing data stored in a mobile device, the method comprising:
　　receiving, by one or more computing devices, a transmission from a proximity broadcasting device, the transmission being a data packet that includes a unique identifier corresponding to the proximity broadcasting device;
　　identifying, by the one or more computing devices, a proximity broadcasting system corresponding to the proximity broadcasting device based on the unique identifier;
　　selecting, by the one or more computing devices, at least one transaction data set corresponding to the proximity broadcasting system from among a plurality of transaction data sets, the plurality of transaction data sets being arranged in a hierarchical order, and wherein the plurality of transaction data sets are payment credentials;
　　prioritizing, by the one or more computing devices, the at least one transaction data set above the remaining transaction data sets in the hierarchical order; and modifying, by the one or more computing devices, the hierarchical order of the prioritized data set.

6. The method of claim 5, wherein the transmission from the proximity broadcasting device is a Bluetooth low energy transmission.

7. The method of claim 6, wherein the proximity broadcasting system is identified by:
transmitting, by the one or more computing devices over a communications network, the unique identifier to a server; and
receiving, by the one or more computing devices, from the server the identity of the proximity broadcasting system.

8. The method of claim 7, further comprising:
receiving, by the one or more computing devices, from another communicatively coupled server the identity of at least one preferred transaction data set; and
selecting, by the one or more computing devices, the at least one transaction data set corresponding to the proximity broadcasting system when the at least one transaction data set is the at least one preferred transaction data set.

9. A non-transitory computer-readable medium having stored thereon sequences of instruction for causing at least one processor to:
receive a transmission from a proximity broadcasting device, the transmission being a data packet that includes a unique identifier corresponding to the proximity broadcasting device;
identify a proximity broadcasting system corresponding to the proximity broadcasting device based on the unique identifier;
select at least one transaction data set corresponding to the proximity broadcasting system from among a plurality of transaction data sets, the plurality of transaction data sets being arranged in a hierarchical order, and wherein the plurality of transaction data sets are payment credentials;
prioritize the at least one transaction data set above the remaining transaction data sets in the hierarchical order; and
modify the hierarchical order of the prioritized data set.

10. The non-transitory computer-readable medium of claim 9, having stored thereon further sequences of instruction for causing the at least one processor to identify the proximity broadcasting system by:
transmitting, over a communications network, the unique identifier to a server; and
receiving from the server the identity of the proximity broadcasting system.

11. The non-transitory computer-readable medium of claim 10, having stored thereon further sequences of instruction for causing the at least one processor to:
receive from another communicatively coupled server the identity of at least one preferred transaction data set; and
select the at least one transaction data set corresponding to the proximity broadcasting system when the at least one transaction data set is the at least one preferred transaction data set.

12. The non-transitory computer-readable medium of claim 9, wherein the transmission from the proximity broadcasting device is a Bluetooth low energy transmission.

* * * * *

UNITED STATES PATENT AND TRADEMARK OFFICE
CERTIFICATE OF CORRECTION

PATENT NO. : 10,390,199 B2
APPLICATION NO. : 14/614630
DATED : August 20, 2019
INVENTOR(S) : Kai P. Johnson and Ryan L. Watkins It is certified that error appears in the above-identified patent and that said Letters Patent is hereby corrected as shown below:

In the Claims

Column 23, Claim 7, Line 6 should read "--The method of claim 5, wherein the proximity broadcasting--"

Signed and Sealed this
Twelfth Day of November, 2019

Andrei Iancu
*Director of the United States Patent and Trademark Office*